Patented July 26, 1938

2,124,675

UNITED STATES PATENT OFFICE 2,124,675

METHOD FOR THE POLYMERIZATION OF ROSIN

Alfred L. Rummelsburg, Wilmington, Del., assignor to Hercules Powder Company, Wilmington, Del., a corporation of Delaware No Drawing. Application February 20, 1936, Serial No. 64,939

13 Claims. (Cl. 260—97)

This invention relates to a polymerized rosin and to a method for its production.

Heretofore it has been known that rosin can be polymerized by treatment with boron trifluoride. German Patent No. 564,897 discloses a process by which rosin is treated in solution with boron trifluoride for 40 to 60 hours at room temperature, with a resultant increase of 20–22° C. in the melting point of the rosin, but with a decrease of 36–40 units in the acid number. The long reaction period required by this process is a great disadvantage in commercial operation. Furthermore, the product is entirely unsuited for many uses due to its low acid number.

Now, I have discovered that I can polymerize rosin with the increase in melting point produced by the prior art process, without an undesirable reduction in acid number, by limiting the time of contact between the boron trifluoride and the rosin to not exceeding about two hours. A contact period within the range from about five minutes to about two hours will be effective. The temperature of the reaction mixture is preferably maintained within the range of about 5° C. to about 30° C., though temperatures higher than 30° C. may be used where very small amounts of boron trifluoride are used. This discovery is very surprising to me, since it would reasonably be expected that the shortening of the reaction time and using a comparatively low temperature would produce very little or no increase in the melting point of the rosin.

In accordance with my invention, there is provided a process whereby the melting point of rosin is substantially increased, with no substantial decrease in the acid number of the rosin, by treatment of rosin with boron trifluoride for a comparatively short period of time at a temperature within the range of about 5° C. to about 30° C. This process will be found to be a distinct improvement over the prior art process, from the standpoint of economy inherent in the use of a short reaction period, and in producing a product of high acid number.

The product in accordance with my invention is a polymerized rosin melting 10° C. to about 28° C. higher than the unpolymerized rosin and having an acid number not substantially lower than that of the rosin before polymerization. Thus, a polymerized wood rosin in accordance with this invention will have a melting point within the range of about 90° C. to about 108° C. and an acid number within the range of about 152 to about 170, depending on the acid number of the original rosin. Thus FF wood rosin has an acid number of 152–160, while I wood rosin has an acid number of 162–165. In either case, the acid number will be substantially unchanged by this method.

A polymerized gum rosin made in accordance with this invention will have a melting point within the range of about 90° C. to about 120° C. and an acid number within the range of about 152 units to about 170 units. Gum rosin is, in general, somewhat more readily polymerized than wood rosin, so that it is possible to obtain a somewhat greater increase in the melting point of gum rosin without decrease in acid number than can usually be obtained with wood rosin. Thus, a polymerized gum rosin having a melting point from about 10° C. to about 40° C. higher than the original rosin and an acid number substantially equal to that of the original rosin, may be prepared by this method. With both wood rosin and gum rosin, however, it will be found that slightly less increase in melting point can be obtained without decrease in acid number with the more highly purified forms, as "commercial grade" abietic acid from wood rosin, or distilled gum rosin, than with the ordinary grades of these rosins. Due to the fact that the highly purified forms of both wood and gum rosin have higher melting points to start with than the ordinary grades of these rosins, the polymerized products will usually have higher melting points than such products made from the ordinary grades, in spite of having undergone a slightly smaller net increase in melting point.

My product is particularly valuable in having a high melting point and at the same time having an acid number substantially equal to that of ordinary rosin, for use in soaps and rosin sizes, since it reacts more readily with alkalies and yields salts more soluble in water than the prior art polymerized rosins. Thus, a rosin size prepared from my product gives transparent solutions when dissolved in water, while a size prepared from the prior art polymerized rosin gives an aqueous solution which is hazy and in some cases entirely opaque due to its high content of non-acid bodies.

More particularly, the method in accordance with my invention involves the treatment of rosin in solution in a suitable solvent with boron trifluoride gas, for a period within the range of about five minutes to about two hours, with agitation and sufficient cooling to maintain the temperature within the range of about 5° C. to about 30° C. The total weight of boron trifluoride added to the reaction may vary from about 1.0% to about 30% of the weight of the rosin treated, and will depend upon the desired increase in the melting point of the rosin. Where a temperature higher than 30° C. is used, the amount of boron trifluoride used will be less than 1.0%. After the reaction has continued for the desired period of time, water may be added to decompose and remove the boron trifluoride. This wash water is then separated and saved for recovery of the boron trifluoride. The rosin solution is then washed with hot and cold water until the boron and fluorine content becomes negligible. The polymerized rosin is then recovered from the solution by evaporation of the volatile solvent.

The rosin treated may be any one of the number of known types. Thus, it may be any grade of French or American gum rosin; any grade of wood rosin, including those refined by the various methods known to the art; isomerized rosin, heat treated rosin, abietic acid, pimaric acid, etc.

Any suitable inert solvent for rosin may be used in this method, such as, for example, benzene, suitable cuts of petroleum hydrocarbons, as gasoline, petroleum ether, toluene, xylene, ethylene dichloride, carbon tetrachloride, etc. The amount of solvent used may vary over a wide range, depending upon the exact procedure used. Thus, for example, the ratio of rosin to solvent may vary from about 7:1 to about 1:10. The amount of water added to stop the action of the boron trifluoride will depend on the amount of boron trifluoride present and will usually be within the range of about 100 cc. to about 2500 cc. per 600 grams of rosin in solution.

The boron trifluoride for use in this method may be secured from any source. It may be conveniently prepared by reaction of 2 parts by weight fluorspar and 1 part boric anhydride with 3-4 parts concentrated sulfuric acid. The gaseous boron trifluoride evolved from this reaction can be cooled by passing it through a water-cooled condenser, and then, any impurities removed by passage through suitable absorption towers. Thus, hydrogen fluoride may be substantially removed by passage of the gas through an absorption tower packed with sodium fluoride, and silicon fluoride can be substantially removed by passing the gas through fused boric anhydride.

The boron trifluoride used in this method may be replaced by its molecular compounds with aliphatic ethers, for example ethyl ether; with aliphatic acids, for example acetic acid; with phenols, for example hydroxy benzene; with aliphatic alcohols, for example ethyl alcohol, etc. However, such molecular compounds are less active than boron trifluoride alone, and for this reason I prefer to use the latter.

The extent to which the melting point of rosin is increased by this method depends upon the amount of boron trifluoride used for a given amount of rosin, upon the temperature of the reaction mixture and upon the length of time the reaction is allowed to continue. Of these factors, the amount of catalyst used is the most convenient for varying the increase produced in the melting point, since both the temperature and the time of reaction must be limited to avoid a decrease in the acid number of the rosin.

As an example of the method of my invention, 600 grams of I wood rosin dissolved in 900 grams of benzene were treated with about 45-50 grams of boron trifluoride with vigorous agitation and cooling at 4-15° C. for about 1.5 hours. About 2,000 cc. of water were then added and the mixture vigorously shaken. The rosin solution was then separated from the aqueous solution of boron trifluoride, which was set aside for recovery of the boron trifluoride. The rosin solution was then further washed with 2,000 cc. of cold water, followed by washes with three consecutive proportions of warm water. The rosin was then recovered from its solution by evaporating off the benzene, the last trace of benzene being removed at 210° C. and under an absolute pressure of 20 mm. A comparison of the properties of the polymerized rosin produced with those of the original rosin was as follows:

|  | I wood rosin | Polymerized I wood rosin |
| --- | --- | --- |
| Melting point (drop method) | 80° C. | 107° C.-112° C. |
| Acid number | 163 | 162-163 |
| Saponification number | 175 | 172-175 |
| (SCN$_2$) value | 85 | 55-70 |
| Unsaponifiable matter | 8% | 4% |
| Ave. molecular wgt. (Rast method) | 300 | 400 |

As a further example of the method of my invention, a solution of 300 grams of I wood rosin dissolved in 600 grams of V. M. & P. naphtha was treated with 12 grams of boron trifluoride with vigorous stirring at room temperature (20-30° C.) for a period of ¾ of an hour. The reaction mixture was then agitated for a period of two hours. The solution was then washed with 1,000 cc. of cold water followed by washes with three consecutive portions of 1,000 cc. each of cold water. The solvent was then evaporated from the rosin solution with a final oil bath temperature of 210° C. and an absolute pressure of 20 mm. The characteristics of the product, as compared with the original I wood rosin were as follows:

|  | I wood rosin | Polymerized I wood rosin |
| --- | --- | --- |
| Melting point (drop method) | 80° C. | 91.5° C. |
| Acid number | 163 | 165 |
| Saponification number | 173 | 178 |
| (SCN$_2$) value | 85 | 81 |
| Unsaponifiable matter | 8% | 6% |

The following example may be cited as an illustration of the use of very small amounts of boron trifluoride at temperatures above 30° C. for the production of a high acid number polymerized rosin, in accordance with this invention. A solution of 250 grams of I wood rosin in 750 grams of benzol was maintained at a temperature of 55° C., while 1.0 gram of boron trifluoride was added to the solution in a period of 10 minutes with vigorous agitation. The mixture was then agitated for an additional 20 minutes at 55° C., washed free of boron trifluoride and its decomposition products, and then the polymerized rosin recovered by evaporation of the benzol at an absolute pressure of 20 mm. and a final temperature of 200° C. The polymerized rosin recovered gave the following analysis:

Melting point (drop method) _____ 91° C.
Acid number _____ 165
Color (standard U. S. rosin types) _____ E It will be understood that the details and examples hereinbefore set forth are illustrative only, and that the invention as herein broadly described and claimed is in no way limited thereby.

This method may be used in a batch process, as in the above examples, or it may be used in a continuous process. For continuous production, a suitable solution of rosin may be fed continuously through a reaction vessel provided with suitable temperature control, in which it is admixed with boron trifluoride in suitable amount. The relative amounts of rosin and boron trifluoride can be controlled by their relative rates of flow into the reaction vessel. After the passage of the solution through the reaction zone, the reaction may be stopped by the introduction of water in concurrent or counter-current flow, after which the rosin solution is continuously separated from the aqueous solution of boron trifluoride, and the rosin solution passed continuously into an evaporator where the solvent is removed continuously from the rosin. The time of reaction can be adjusted by the length of the reaction zone and by the rate of flow of the reaction mixture through the reaction zone. The temperature of the reaction zone may be conveniently regulated by means of a water jacket. The water added to the reaction mixture will preferably be added in counter-current flow to secure a maximum removal of boron trifluoride. The rosin solution may, if desired, be subjected to two or more separate treatments with water before it flows into the evaporator, although in general a plurality of such treatments will be found unnecessary.

It will be understood that hereinbefore, and in the appended claims, where reference is made to the melting point of rosin or polymerized rosin, the melting point, as determined by the drop method, of the rosin or polymerized rosin in the amorphous or resinous form rather than in the crystalline form, is meant.

What I claim and desire to protect by Letters Patent is:

1. The method for the polymerization of rosin without decreasing its acidity which includes treating rosin with a compound selected from the group comprising boron trifluoride and molecular compounds of boron trifluoride, at a temperature of not more than 30° C. for a period of time within the range of about 5 minutes to about 2 hours whereby a polymerized rosin, having a substantially increased melting point and an acid number substantially equal to that of the original rosin, is produced.

2. The method for the polymerization of rosin without decreasing its acidity which includes treating rosin with boron trifluoride at a temperature within the range of about 5° C. to about 30° C. for a period of time within the range of about 5 minutes to about 2 hours whereby a polymerized rosin, having a substantially increased melting point and an acid number substantially equal to that of the original rosin, is produced.

3. The method for the polymerization of rosin without decreasing the acidity which includes treating rosin with boron trifluoride in amount within the range of about 1.0% to about 30% of the rosin at a temperature within the range of about 5° C. to about 30° C., and for a period of time within the range of about 5 minutes to about 2 hours whereby a polymerized rosin, having a substantially increased melting point and an acid number substantially equal to that of the original rosin, is produced.

4. The method for the polymerization of rosin without decreasing its acidity which includes treating a solution of rosin with boron trifluoride at a temperature within the range of about 5° C. to about 30° C. for a period of time within the range of about 5 minutes to about 2 hours whereby a polymerized rosin, having a substantially increased melting point and an acid number substantially equal to that of the original rosin, is produced.

5. The method for the polymerization of wood rosin without decreasing its acidity which includes treating a solution of wood rosin with boron trifluoride at a temperature within the range of about 5° C. to about 30° C. for a period of time within the range of about 5 minutes to about 2 hours whereby a polymerized rosin, having a substantially increased melting point and an acid number substantially equal to that of the original rosin, is produced.

6. The method for the polymerization of gum rosin without decreasing its acidity which includes treating a solution of gum rosin with boron trifluoride at a temperature within the range of about 5° C. to about 30° C. for a period of time within the range of about 5 minutes to about 2 hours whereby a polymerized rosin, having a substantially increased melting point and an acid number substantially equal to that of the original rosin, is produced.

7. The method for the polymerization of rosin which includes treating rosin with a small amount of boron trifluoride for a period of time within the range about five minutes to about two hours at a temperature not higher than about 55° C., the amount of boron trifluoride and the temperature at which the treatment is carried out being such that polymerization will be effected without material reduction in the acid number of the rosin.

8. The method for the polymerization of rosin without decreasing its acidity which includes treating a solution of rosin with boron trifluoride at a temperature within the range of about 5° C. to about 30° C. for a period of time within the range of about 5 minutes to about 2 hours and recovering the polymerized rosin from the solution by evaporation of the solvent, whereby a polymerized rosin having a substantially increased melting point and an acid number substantially equal to that of the original rosin is produced.

9. The method for the polymerization of rosin without decreasing its acidity which includes treating a solution of rosin in a substantially water immiscible solvent with boron trifluoride at a temperature within the range of about 5° C. to about 30° C. for a period of time within the range of about 5 minutes to about 2 hours, washing the rosin solution with water until the boron and fluorine content of the solution becomes negligible and recovering the polymerized rosin from the solution by evaporation of the solvent, whereby a polymerized rosin having a substantially increased melting point and an acid number substantially equal to that of the original rosin is produced.

10. The method for the polymerization of rosin without decreasing its acidity which includes treating a solution of rosin in a volatile hydrocarbon with boron trifluoride at a temperature within the range of about 5° C. to about 30° C. for a period of time within the range of about 5 minutes to about 2 hours, washing the rosin solution with water until the boron and fluorine content of the solution becomes negligible and recovering polymerized rosin from the solution by the evaporation of the solvent, whereby a polymerized rosin having a substantially increased melting point and an acid number substantially equal to that of the original rosin is produced.

11. The method for the polymerization of rosin without decreasing its acidity which includes treating a solution of rosin in benzol with boron trifluoride at a temperature within the range of about 5° C. to about 30° C. for a period of time within the range of about 5 minutes to about 2 hours, washing the rosin solution with water until the boron and fluorine content of the solution becomes negligible and recovering polymerized rosin from the solution by the evaporation of the benzol, whereby a polymerized rosin having a substantially increased melting point and an acid number substantially equal to that of the original rosin is produced.

12. The method for the polymerization of rosin without decreasing its acidity which includes treating a solution of rosin in gasoline with boron trifluoride at a temperature within the range of about 5° C. to about 30° C. for a period of time within the range of about 5 minutes to about 2 hours, washing the rosin solution with water until the boron and fluorine content of the solution becomes negligible and recovering polymerized rosin from the solution by the evaporation of the gasoline, whereby a polymerized rosin having a substantially increased melting point and an acid number substantially equal to that of the original rosin is produced.

13. The method for the polymerization of rosin without decreasing its acidity which includes treating a solution of rosin in ethylene dichloride with boron trifluoride at a temperature within the range of about 5° C. to about 30° C. for a period of time within the range of about 5 minutes to about 2 hours, washing the rosin solution with water until the boron and fluorine content of the solution becomes negligible and recovering polymerized rosin from the solution by the evaporation of the ethylene dichloride, whereby a polymerized rosin having a substantially increased melting point and an acid number substantially equal to that of the original rosin is produced.

ALFRED L. RUMMELSBURG.